United States Patent
Nakagaki et al.

(10) Patent No.: US 10,662,555 B2
(45) Date of Patent: May 26, 2020

(54) POLYIMIDE FIBER AND METHOD FOR PRODUCING POLYIMIDE FIBER

(71) Applicant: I.S.T Corporation, Shiga (JP)

(72) Inventors: Ryuta Nakagaki, Shiga (JP); Katsuki Morishima, Shiga (JP); Koji Moriuchi, Shiga (JP)

(73) Assignee: I.S.T. CORPORATION, Shiga (JP)

( * ) Notice: Subject to any disclaimer, the term of this patent is extended or adjusted under 35 U.S.C. 154(b) by 265 days.

(21) Appl. No.: 15/425,249

(22) Filed: Feb. 6, 2017

(65) Prior Publication Data

US 2017/0283990 A1  Oct. 5, 2017

(30) Foreign Application Priority Data

Mar. 31, 2016 (JP) ................................. 2016-071411

(51) Int. Cl.
  *D01F 6/74* (2006.01)
  *B29C 48/05* (2019.01)
  (Continued)

(52) U.S. Cl.
  CPC .............. *D01F 6/74* (2013.01); *B29C 48/022* (2019.02); *B29C 48/05* (2019.02);
  (Continued)

(58) Field of Classification Search
  CPC ... D10B 2331/14; C08G 73/1067; D01F 6/74; B29K 2079/08; B29K 2079/085
  See application file for complete search history.

(56) References Cited

U.S. PATENT DOCUMENTS 4,690,999 A * 9/1987 Numata ................. C08G 73/10
                                                       528/188
4,801,502 A * 1/1989 Weinrotter ............... D01F 6/74
                                                        264/134
(Continued)

FOREIGN PATENT DOCUMENTS

CN       1732230 A     2/2006
CN     102766270 A    11/2012
(Continued)

OTHER PUBLICATIONS

Machine Translation of JP 2010031417 (Year: 2019).*
(Continued)

*Primary Examiner* — Michael M Dollinger
(74) *Attorney, Agent, or Firm* — Hamre, Schumann, Mueller & Larson, P.C.

(57) ABSTRACT

The method for producing a polyimide fiber includes a coagulation step of forming a polyimide precursor fiber by extruding a polyimide precursor solution containing a polyimide precursor and a compound having an acid dissociation constant (pKa) of a conjugate acid in water at 25° C. of 6.0 to 10 inclusive and an octanol-water partition coefficient (Log P) at 25° C. of −0.75 to 0.75 inclusive into a poor solvent or nonsolvent for the polyimide precursor; and a heat drawing step of forming the polyimide fiber by drawing the polyimide precursor fiber while heating same. The polyimide fiber of the present disclosure has a physical property such that the coefficient of thermal expansion thereof is in the range of −15 ppm/K to 0 ppm/K inclusive.

9 Claims, 2 Drawing Sheets (51) Int. Cl.
  *B29C 48/00* (2019.01)
  *D01D 5/06* (2006.01)
  *D01F 1/10* (2006.01)
  *C08G 73/10* (2006.01)
  *D01F 6/88* (2006.01)
  *B29K 79/00* (2006.01)

(52) U.S. Cl.
  CPC ........... *C08G 73/1067* (2013.01); *D01D 5/06* (2013.01); *D01F 1/10* (2013.01); *B29K 2079/08* (2013.01); *D01F 6/88* (2013.01); *D10B 2401/04* (2013.01); *D10B 2401/061* (2013.01); *D10B 2401/063* (2013.01)

(56) References Cited

U.S. PATENT DOCUMENTS

| | | | | |
|---|---|---|---|---|
| 4,943,481 A * | 7/1990 | Schilo | ............... | D01F 6/74 428/364 |
| 5,178,810 A * | 1/1993 | Vodiunig | ............... | B29C 43/006 264/113 |
| 5,260,407 A * | 11/1993 | Saruwatari | ............... | B29C 55/005 264/288.4 |
| 5,599,380 A * | 2/1997 | Koros | ............... | B01D 53/228 95/54 |
| 5,700,310 A * | 12/1997 | Bowman | ............... | B01D 53/04 95/143 |
| 8,066,799 B2 | 11/2011 | Miller et al. | | |
| 8,328,906 B2 | 12/2012 | Miller et al. | | |
| 8,703,842 B1 * | 4/2014 | Chen | ............... | C08K 3/22 523/219 |
| 9,193,067 B2 | 11/2015 | Fujimura et al. | | |
| 9,279,036 B1 * | 3/2016 | Miyamoto | ............... | C08G 73/1078 |
| 9,493,614 B2 * | 11/2016 | Wakita | ............... | C08G 73/1007 |
| 2006/0063908 A1 | 3/2006 | Moriuchi et al. | | |
| 2009/0178561 A1 | 7/2009 | Miller et al. | | |
| 2010/0140557 A1 | 6/2010 | Moriuchi et al. | | |
| 2012/0067208 A1 | 3/2012 | Miller et al. | | |
| 2012/0251287 A1 | 10/2012 | Fujimura et al. | | |
| 2012/0259072 A1 * | 10/2012 | Hougham | ............... | C08L 63/00 525/449 |
| 2014/0011089 A1 | 1/2014 | Yamada et al. | | |
| 2014/0127513 A1 * | 5/2014 | Nakajima | ............... | C08K 3/04 428/411.1 |
| 2016/0168329 A1 | 6/2016 | Sato et al. | | |
| 2018/0076461 A1 | 3/2018 | Yamada et al. | | |

FOREIGN PATENT DOCUMENTS

| | | |
|---|---|---|
| CN | 103429640 A | 12/2013 |
| JP | S6065112 | 4/1985 |
| JP | H10228258 | 1/1990 |
| JP | 08291252 A * | 11/1996 |
| JP | 2010031417 A | 2/2010 |
| JP | 2010180494 | 8/2010 |
| JP | 2010180494 A | 8/2010 |
| JP | 2011509819 | 3/2011 |
| JP | 2012251287 | 12/2012 |
| JP | 2012251287 A | 12/2012 |
| RU | 2510435 C1 | 3/2014 |

OTHER PUBLICATIONS

Zhuang et al. Effect of Isomerism on Molecular Packing and Gas Transport Properties of Poly(benzoxazole-co-imide)s. Macromolecules 2014, 47, 7947-7957. dx.doi.org/10.1021/ma501891m. (Year: 2014).*

Yin et al. Enhanced mechanical and hydrophobic properties of polyimide fibers containing benzimidazole and benzoxazole units. European Polymer Journal 67 (2015) 88-98. http://dx.doi.org/10.1016/j.eurpolymj.2015.03.028. (Year: 2015).*

Zhang et al. Thermal Mechanical and Dynamic Mechanical Property of Biphenyl Polyimide Fibers. Journal of Applied Polymer Science, vol. 92, 1653-1657 (2004). (Year: 2004).*

Translation of JP 2010031417 provided by Steven Spar at USPTO. Jan. 10, 2019. (Year: 2019).*

Easho et al. High-performance aromatic polyimide fibres: 2. Thermal and dynamic properties. Polymer, 1993, vol. 34, No. 15, p. 3209-3215. (Year: 1993).*

Cheng et al. A high performance aromatic polyimide fibre: 1. Structure, properties and mechanical history dependece. Polymer, 1991, vol. 32, No. 10, p. 1803-1810. (Year: 1991).*

Cheng 2. Rigid-Rod and Segmented Rigid-Rod Polyimides: GEL/SOL and Liquid Crystalline Transitions, Fibers and Films. (Mat. Res. Soc. Symp. Proc. vol. 227. (Year: 1991).*

Machine Translation of JP 5516925 (Year: 2019).*

Yang et al. Macromolecular Research, vol. 12, No. 3, pp. 263-268 (2004). (Year: 2004).*

* cited by examiner

POLYIMIDE FIBER AND METHOD FOR PRODUCING POLYIMIDE FIBER

BACKGROUND OF THE INVENTION

1. Field of the Invention

The present disclosure relates to a polyimide fiber and a method for producing a polyimide fiber.

2. Description of the Related Art

Polyimide has excellent characteristics in terms of heat resistance, chemical resistance, mechanical properties, electric properties and the like, and thus is widely used in the fields of electronic components, batteries, automobiles, aerospace industry and the like.

As an example in which polyimide having such characteristics is used, it is sought to use polyimide for a fiber material of fiber reinforced plastic (FRP). In order to achieve this purpose, it is desired to produce polyimide fibers having an adequate strength. Various methods for producing polyimide fibers have so far been proposed (for example, see Japanese Patent Application Laid-open Nos. S60-65112 and 2010-180494).

Japanese Patent Application Laid-open No. S60-65112 discloses preparing a dope solution by dissolving a soluble powder polyimide in a phenolic solvent and forming the dope solution into a shape of fiber by wet spinning.

Japanese Patent Application Laid-open No. 2010-180494 discloses a method for producing a polyimide fiber by solution spinning using a solution of soluble polyimide in an aprotic polar organic solvent.

SUMMARY OF THE INVENTION

Polyimide fibers can be produced by wet spinning, as disclosed in Japanese Patent Application Laid-open Nos. S60-65112 and 2010-180494. In wet spinning, a polyimide solution which serves as a polyimide fiber material is extruded into a coagulation bath liquid in order to coagulate the material into a shape of fiber. A variety of studies have been carried out on the components of the coagulation bath liquid used for wet spinning by now, in consideration to the impact the components have on physical properties of resulting polyimide fibers.

For example, in Japanese Patent Application Laid-open No. S60-65112, the coagulation bath liquid used is an alcoholic solvent which is compatible with the phenolic solvent in the dope solution. Meanwhile, Japanese Patent Application Laid-open No. 2010-180494 indicates that use of a solvent having low compatibility with polyimide, such as water or a lower alcohol, results in rapid solidification of the dope and the obtained fibers being clouded. Therefore, Japanese Patent Application Laid-open No. 2010-180494 suggests reducing the coagulation rate of the dope by using a higher alcohol such as octanol, glycerine, or an aqueous solution of the solvent used for the polyimide dope.

However, Japanese Patent Application Laid-open Nos. S60-65112 and 2010-180494 pose a limitation, i.e. the use a soluble polyimide as a material for polyimide fibers. That is to say, it is not possible to use an insoluble polyimide as a fiber material and the type of the polyimide component in the polyimide fibers is limited. Therefore, polyimide fibers with the desired physical properties cannot be obtained.

In these circumstances, the present disclosure provides a method which, through the use of a wider range of polyimide components, enables providing polyimide fibers having preferable physical properties, and also provides a polyimide fiber having preferable physical properties.

The polyimide fiber according to the first aspect of the present disclosure has a coefficient of thermal expansion in the range of −15 ppm/K to 0 ppm/K inclusive.

The polyimide fiber according to the first aspect of the present disclosure preferably has an elastic modulus in the range of 320 cN/dtex to 1,100 cN/dtex inclusive.

The polyimide fiber according to the first aspect of the present disclosure preferably has a strength in the range of 6.5 cN/dtex to 25 cN/dtex inclusive.

The polyimide fiber according to the first aspect of the present disclosure preferably has a specific gravity in the range of 1.45 to 1.55 inclusive.

The polyimide fiber according to the first aspect of the present disclosure preferably has an equilibrium moisture regain of at or below 2%.

The method for producing a polyimide fiber according to the second aspect of the present disclosure includes a coagulation step of forming a polyimide precursor fiber by extruding a polyimide precursor solution containing a polyimide precursor and a compound having an acid dissociation constant (pKa) of a conjugate acid in water at 25° C. in the range of 6.0 to 10 inclusive and an octanol-water partition coefficient (Log P) at 25° C. in the range of −0.75 to 0.75 inclusive into a poor solvent or nonsolvent for the polyimide precursor, and a heat drawing step of forming the polyimide fiber by drawing the polyimide precursor fiber while heating same.

In the method for producing the polyimide fiber according to the second aspect of the present disclosure, the poor solvent or the nonsolvent may contain water as a main component. The poor solvent and the nonsolvent may be mixed. Such a mixed solvent may be classified into the poor solvent or the nonsolvent depending on the characteristics thereof.

In the method for producing the polyimide fiber according to the second aspect of the present disclosure, it is preferable that the polyimide precursor contains a tetracarboxylic acid-based compound-derived unit and the polyimide precursor solution contains the compound in the range of 0.1 moles to 1.0 mole inclusive relative to 1 mole of the tetracarboxylic acid-based compound-derived unit.

In the method for producing the polyimide fiber according to the second aspect of the present disclosure, it is preferable that the method further includes a precursor formation step of obtaining the polyimide precursor by polymerising a tetracarboxylic acid-based compound and a diamine compound in an organic polar solvent and the polyimide precursor solution contains the compound in the range of 0.1 moles to 1.0 mole inclusive relative to 1 mole of the tetracarboxylic acid-based compound.

In the method for producing the polyimide fiber according to the second aspect of the present disclosure, it is preferable that the tetracarboxylic acid-based compound is at least either of 3,3',4,4'-biphenyltetracarboxylic dianhydride and pyromellitic dianhydride. Alternatively, in the method for producing the polyimide fiber according to the second aspect of the present disclosure, it is preferable that the tetracarboxylic acid-based compound-derived unit is derived from at least either of a 3,3',4,4'-biphenyltetracarboxylic acid-based compound and a pyromellitic acid-based compound.

In the method for producing the polyimide fiber according to the second aspect of the present disclosure, it is preferable that the diamine compound is at least either of para-phenylenediamine and 4,4'-diaminodiphenyl ether.

The third aspect of the present disclosure is a method of using, in production of a polyimide fiber using a polyimide precursor solution as a starting material, a compound having an acid dissociation constant (pKa) of a conjugate acid in water at 25° C. in the range of 6.0 to 10 inclusive and an octanol-water partition coefficient (Log P) at 25° C. in the range of −0.75 to 0.75 inclusive as a coagulation alleviating agent of a polyimide precursor in the polyimide precursor solution.

The present disclosure also encompasses a polyimide fiber obtained by the method for producing the polyimide fiber according to the second aspect of the present disclosure.

According to the present disclosure, the polyimide precursor solution contains the compound having an acid dissociation constant (pKa) of a conjugate acid in water at 25° C. in the range of 6.0 to 10 inclusive and an octanol-water partition coefficient (Log P) at 25° C. in the range of −0.75 to 0.75 inclusive. The compound alleviates coagulation of the polyimide precursor, and thus allows the provision of a polyimide fiber having preferable physical properties by preventing whitening of the polyimide precursor in the coagulation step.

It is believed that the compound acts as a coagulation alleviating agent of the polyimide precursor because of the following reasons. Namely, in the polyimide precursor solution, the polymer-type polyimide precursor is acidic and the compound is basic. Therefore, in the polyimide precursor solution, the polymer-type polyimide precursor and the compound partially form a salt. Accordingly, it is inferred that the polyimide precursor solution has an increased hydrophilicity and coagulation of the polyimide precursor may be delayed when the polyimide precursor solution is extruded into a poor solvent such as an aqueous coagulation bath. The term "poor solvent" as used herein means a solvent having low solubility of a polyimide. The term "nonsolvent" as used herein means a solvent into which a polyimide is utterly insoluble.

Thus, according to the method for producing a polyimide fiber of the present disclosure, it is configured that the polyimide precursor solution contains the compound, and thus a polyimide fiber having preferable physical properties can be obtained by using an aqueous coagulation bath liquid having decreased burdens on the environment. In addition, according to the method for producing a polyimide fiber of the present disclosure, a polyimide fiber having a strength that allows use thereof as a fiber material such as fiber reinforced plastic (FRP) can be obtained.

Further, in the present disclosure, the spun fiber contains the compound, and thus imidization is promoted during formation of the polyimide fiber in the heat drawing step following the coagulation step. This leads to reduction in the production time.

As described above, the compound acts as a coagulation alleviating agent in the coagulation step as well as acting as an imidization promoting agent in the following heat drawing step. Namely, in the present disclosure, the compound can exhibit both functions of alleviating coagulation and promoting imidization.

Finally, in the present disclosure, a polyimide fiber can be produced by spinning a polyimide precursor solution. Accordingly, the polyimide components (monomer components) are not limited, unlike in production of polyimide fibers from a polyimide solution, and thus a wider range of components can be used for production of polyimide fibers. Therefore, a polyimide fiber having further excellent physical properties such as strength can be obtained.

DESCRIPTION OF THE PREFERRED EMBODIMENTS

An embodiment of the present disclosure is hereinafter described. In the present embodiment, the present disclosure is described by way of an example of the method for producing a polyimide fiber according to the present disclosure. In the present embodiment, an example of the polyimide fiber according to the present disclosure is also described. Further, in the present embodiment, the polyimide precursor solution and the polyimide precursor fiber used for production of the polyimide fiber of the present disclosure are also described.

<Method for Producing a Polyimide Fiber>

Figure 1:
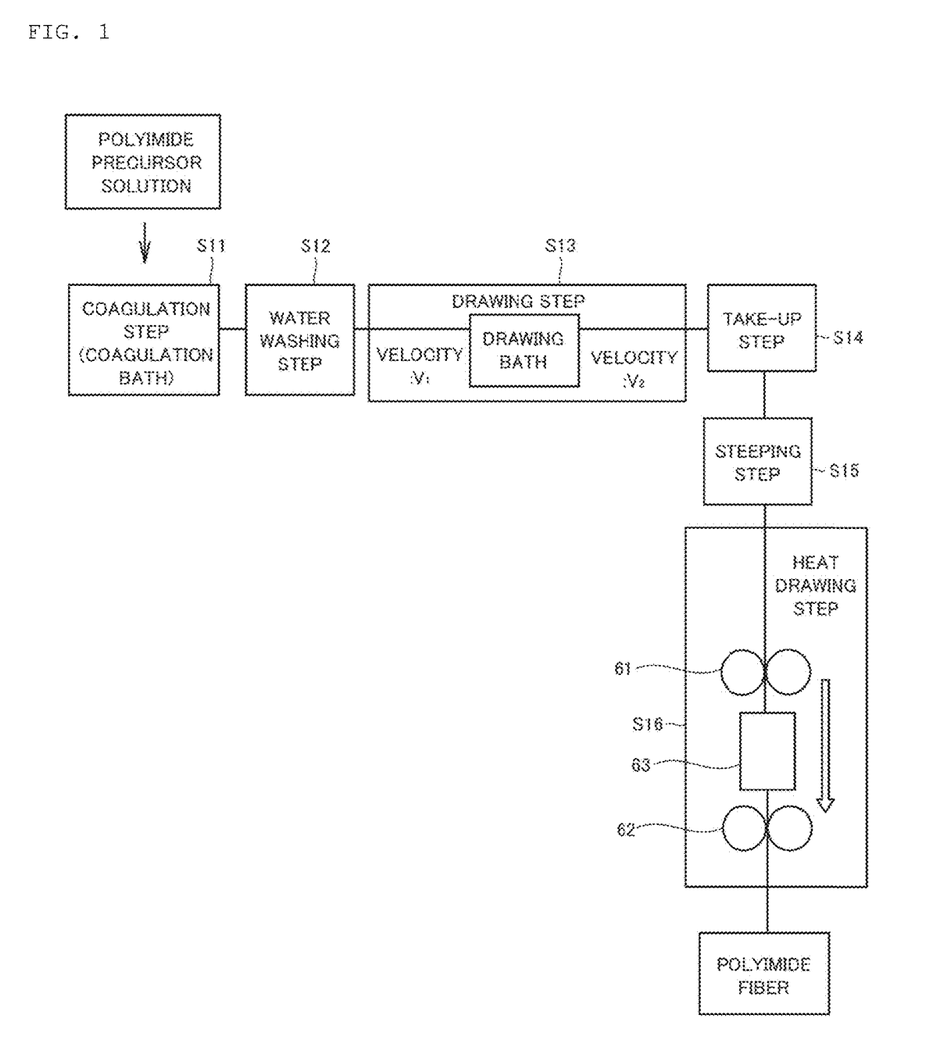
FIG. 1 is a schematic view showing the flow of steps in the method for producing a polyimide fiber of an embodiment of the present disclosure.

In the present embodiment, the method for producing a polyimide fiber by wet spinning or dry-wet spinning is described. FIG. 1 shows the flow of the steps in the method for producing a polyimide fiber according to the present embodiment. As shown in FIG. 1, the method for producing a polyimide fiber include, in this order, a coagulation step (S11), a water washing step (S12), a drawing step (S13), a take-up step (S14), a steeping step (S15) and a heat drawing step (S16).

In the coagulation step (S11), a polyimide precursor solution containing at least a polyimide precursor and a compound having an acid dissociation constant (pKa) of a conjugate acid in water at 25° C. in the range of 6.0 to 10 inclusive and an octanol-water partition coefficient (Log P) at 25° C. in the range of −0.75 to 0.75 inclusive is extruded into a coagulation bath (a poor solvent for the polyimide precursor) containing water as a main component to form a fibrous polyimide precursor (i.e., a polyimide precursor fiber). The compound having pKa and Log P in the above ranges may be referred to as a "hydrophilic and basic compound" in other words.

The polyimide precursor solution used in the coagulation step (S11) is prepared, for example, as follows:

The polyimide precursor solution contains at least the polyimide precursor and the hydrophilic and basic compound. The polyimide precursor solution of the present embodiment contains polyamic acid as the polyimide precursor. Polyamic acid is obtained by polymerising, for example, approximately equivalent moles of a tetracarboxylic acid-based compound and a diamine compound. Polyamic acid is imidized by, for example, heating to give a polyimide resin. Polyamic acid is also referred to as a polymer-type polyimide precursor. The term "tetracarboxylic acid-based compound" as used herein includes "tetracarboxylic acids" and "tetracarboxylic acid derivatives such as tetracarboxylic dianhydrides and tetracarboxylic diesters". The tetracarboxylic acid derivatives such as tetracarboxylic dianhydrides and tetracarboxylic diesters can be prepared from a tetracarboxylic dianhydride.

The polyimide precursor solution containing polyamic acid may be obtained by dissolving the tetracarboxylic acid-based compound and the diamine compound in an organic solvent for reaction. The molar ratio between the tetracarboxylic acid-based compound and the diamine compound added to the organic solvent is generally in the range of 55:45 to 45:55. The molar ratio between the tetracarboxylic acid-based compound and the diamine compound may be appropriately varied beyond the above range as far as the purpose of the present disclosure is attained.

The tetracarboxylic dianhydride used includes aromatic tetracarboxylic dianhydrides such as pyromellitic dianhydride (PMDA), 1,2,5,6-naphthalenetetracarboxylic dianhydride, 1,4,5,8-naphthalenetetracarboxylic dianhydride, 2,3,6,7-naphthalenetetracarboxylic dianhydride, 2,2',3,3'-biphenyltetracarboxylic dianhydride, 2,3,3',4'-biphenyltetracarboxylic dianhydride, 3,3',4,4'-biphenyltetracarboxylic dianhydride (BPDA), 2,2',3,3'-benzophenonetetracarboxylic dianhydride, 2,3,3',4'-benzophenonetetracarboxylic dianhydride, 3,3',4,4'-benzophenonetetracarboxylic dianhydride, bis(3,4-dicarboxyphenyl)sulfone dianhydride, bis(2,3-dicarboxyphenyl)methane dianhydride, bis(3,4-dicarboxyphenyl)methane dianhydride, 1,1-bis(2,3-dicarboxyphenyl)ethane dianhydride, 1,1-bis(3,4-dicarboxyphenyl)ethane dianhydride, 2,2-bis[3,4-(dicarboxyphenoxy)phenyl]propane dianhydride, 4,4'-(hexafluoroisopropylidene)diphthalic anhydride, oxydiphthalic anhydride (ODPA), bis(3,4-dicarboxyphenyl) sulfone dianhydride, bis(3,4-dicarboxyphenyl)sulfoxide dianhydride, thiodiphthalic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 9,9-bis(3,4-dicarboxyphenyl)fluorene dianhydride and 9,9-bis[4-(3,4'-dicarboxyphenoxy)phenyl]fluorene dianhydride; cyclobutanetetracarboxylic dianhydride, 1,2,3,4-cyclopentanetetracarboxylic dianhydride, 2,3,4,5-tetrahydrofurantetracarboxylic dianhydride, 1,2,4,5-cyclohexanetetracarboxylic dianhydride, 3,4-dicarboxy-1-cyclohexylsuccinic dianhydride, 3,4-dicarboxy-1,2,3,4-tetrahydro-1-naphthalenesuccinic dianhydride and the like. The tetracarboxylic dianhydrides may be respectively used alone or used as a mixture.

Among the tetracarboxylic dianhydrides, 3,3',4,4'-biphenyltetracarboxylic dianhydride (BPDA), pyromellitic dianhydride (PMDA), oxydiphthalic anhydride (ODPA) and the like are preferred.

The diamine compound is preferably an aromatic diamine compound.

Examples of the aromatic diamine compound used include para-phenylenediamine (PPD), meta-phenylenediamine, 2,5-diaminotoluene, 2,6-diaminotoluene, 2,2'-dimethyl-4,4'-diaminobiphenyl (m-tolidine), 3,3'-dimethyl-4,4'-diaminobiphenyl, 3,3'-dimethoxy-4,4'-diaminobiphenyl, 3,3'-diaminodiphenylmethane, 4,4'-diaminodiphenylmethane, 2,2-bis-(4-aminophenyl)propane, 3,3'-diaminodiphenylsulfone, 4,4'-diaminodiphenylsulfone, 3,3'-diaminodiphenylsulfide, 4,4'-diaminodiphenylsuifide, 3,3'-diaminodiphenyl ether, 3,4'-diaminodiphenyl ether (34ODA), 4,4'-diaminodiphenyl ether (ODA), 1,5-diaminonaphthalene, 4,4'-diaminodiphenyldiethylsilane, 4,4'-diaminodiphenylsilane, 4,4'-diaminodiphenylethylphosphine oxide, 1,3-bis(3-aminophenoxy)benzene, 1,3-bis(4-aminophenoxy)benzene, 1,4-bis(4-aminophenoxy)benzene, bis[4-(3-aminophenoxy)phenyl]sulfone, bis[4-(4-aminophenoxy)phenyl]sulfone, 2,2-bis[4-(4-aminophenoxy)phenyl]propane, 2,2'-bis(trifluoromethyl)benzidine, 2,2-bis(3-aminophenyl)1,1,1,3,3,3-hexafluoropropane, 2,2-bis(4-aminophenyl)1,1,1,3,3,3-hexafluoropropane, 9,9-bis(4-aminophenyl)fluorene and the like. The diamine compounds may be respectively used alone or used as a mixture.

Among the diamine compounds, para-phenylenediamine (PPD), 2,2'-dimethyl-4,4'-diaminobiphenyl (m-tolidine), 4,4'-diaminodiphenyl ether (ODA), 3,4'-diaminodiphenyl ether (34ODA) and 2,2'-bis(trifluoromethyl)benzidine are preferred.

The organic solvent used for preparation of the polyimide precursor solution may be the one that dissolve the polyimide precursor at a high concentration without reacting with the polyimide precursor in the solvent. Examples of the organic solvent used include N-methyl-2-pyrrolidone (NMP), N-ethyl-2-pyrrolidone (NEP), N,N-dimethylformamide (DMF), N,N-dimethylacetamide (DMAc), N,N-diethylacetamide (DEAc), N,N-dimethylpropionamide (DMPr), N,N-dimethylbutylamide (NMBA), N,N-dimethyl isobutylamide (NMIB), N-methylcaprolactam (NMC), N,N-bis(methoxymethyl)acetamide, N-acetylpyrrolidine (NAPr), N-acetylpiperidine, N-methylpiperidone-2 (NMPD), N,N'-dimethylethyleneurea, N,N'-dimethylpropyleneurea, N,N,N',N'-tetramethylmalonamide, N-acetylpyrrolidone, N,N,N',N'-tetramethylurea (TMU), dimethyl sulfoxide (DMSO) and the like. The organic solvents may be respectively used alone or used as a mixture. Among the organic solvents, N-methyl-2-pyrrolidone (NMP) is preferably used because of an ease in handling.

The polyimide precursor solution of the present embodiment also contains the compound having an octanol-water partition coefficient (Log P) at 25° C. in the range of −0.75 to 0.75 inclusive and an acid dissociation constant (pKa) of a conjugate acid in water at 25° C. in the range of 6.0 to 10 inclusive. As described above, the compound may also be referred to as a "hydrophilic and basic compound" in other words.

The compound having an octanol-water partition coefficient (Log P) at 25° C. of at or below 0.75 is preferable because the polyimide precursor solution is hydrophilic, resulting in the coagulated fibers which are not brittle. The octanol-water partition coefficient (Log P) is more preferably at or below 0.25. The compound having an octanol-water partition coefficient (Log P) at 25° C. of at or above −0.75 is preferable because coagulation of fibers is not insufficient or fibers are not flat.

The compound having an acid dissociation constant (pKa) of a conjugate acid in water at 25° C. of at or above 6.0 is preferable because the polyimide precursor solution is basic, resulting in the coagulated fibers which are not brittle. The compound having an acid dissociation constant (pKa) of a conjugate acid in water at 25° C. of at or below 10 is preferable because the spinning solution has a uniform viscosity.

Examples of the compound having an octanol-water partition coefficient (Log P) at 25° C. in the range of −0.75 to 0.75 inclusive and an acid dissociation constant (pKa) of a conjugate acid in water at 25° C. in the range of 6.0 to 10 inclusive include 1,3-diazole-based compounds, N,N-dimethylethanolamine, triisopropanolamine and the like.

The octanol-water partition coefficient (Log P) maybe measured by the shake flask method. Specific methods for measurement are defined in, for example, the "OECD Test Guideline 107" and "JIS Z 7260-107 specified by Japanese Industrial Standards (JIS)". The acid dissociation constant (pKa) of a conjugate acid may be measured on an arbitrary and appropriate measurement instrument or may be found in "CRC HANDBOOK of CHEMISTRY and PHYSICS" and the like.

The polyimide precursor solution according to another embodiment contains a 1,3-diazole-based compound. The 1,3-diazole-based compound may have the structure represented by the following general formula (1):

(1)

wherein in the general formula (1), $R_1$ to $R_4$ are respectively and independently a hydrogen atom or an alkyl group having 1 to 2 carbon atoms.

Further, the 1,3-diazole-based compound is more preferably 1,3-diazole, 1-methyl-1,3-diazole, 2-methyl-1,3-diazole, 1,2-dimethyl-1,3-diazole or 2-ethyl-4-methyl-1,3-diazole. By using the 1,3-diazole-based compound, polyimide fibers having more preferable physical properties can be obtained.

Among the 1,3-diazole-based compounds, 1,3-diazole and 1-methyl-1,3-diazole are still more preferred.

The content of the hydrophilic and basic compound (e.g., a 1,3-diazole-based compound) in the polyimide precursor solution is preferably in the range of, for example, 0.1 moles to 1.0 mole inclusive relative to 1 mole of the unit derived from the tetracarboxylic acid compound (e.g., a tetracarboxylic dianhydride-derived unit) in the polyimide precursor solution. When the content of the hydrophilic and basic compound relative to 1 mole of the tetracarboxylic acid-based compound-derived unit (e.g., a tetracarboxylic dianhydride-derived unit) is at or above 0.1 moles, coagulation of the polyimide precursor can be delayed when the polyimide precursor solution is extruded into a coagulation bath. When the content of the hydrophilic and basic compound relative to 1 mole of the tetracarboxylic acid-based compound-derived unit (e.g., a tetracarboxylic dianhydride-derived unit) is at or below 1.0 mole, swelling of the polyimide precursor can be delayed when the polyimide precursor solution is extruded into a coagulation bath. Namely, by configuring the content of the hydrophilic and basic compound in the polyimide precursor solution so as to be in the range of 0.1 moles to 1.0 mole inclusive, polyimide fibers having preferable physical properties can be produced. Moreover, the content of the hydrophilic and basic compound relative to 1 mole of the tetracarboxylic acid-based compound-derived unit (e.g., a tetracarboxylic dianhydride-derived unit) is more preferably in the range of 0.1 moles to 0.5 moles inclusive and still more preferably in the range of 0.125 moles to 0.4 moles inclusive.

In the method for producing a polyimide fiber of the present embodiment, it is preferable to, in preparation of the polyimide precursor solution, dissolve first of all components of the polyimide precursor (e.g., the tetracarboxylic dianhydride and the diamine compound) in the organic solvent and then add the hydrophilic and basic compound. It is also preferable to dissolve the components of the polyimide precursor, allow reaction thereof over a predetermined time and then add the hydrophilic and basic compound.

Namely, in the method for producing a polyimide fiber of the present embodiment, it is preferable to, prior to the coagulation step (S11), carry out a precursor formation step of polymerising the tetracarboxylic acid-based compound and the diamine compound which serve as materials of the polyimide precursor in the organic polar solvent to obtain the polyimide precursor. When the precursor formation step is carried out, the content of the hydrophilic and basic compound in the polyimide precursor solution in the following coagulation step (S11) may be in the range described above relative to 1 mole of the tetracarboxylic acid-based compound which serves as a material of the polyimide precursor.

By having a predetermined interval between addition of monomer components of polyimide and addition of the hydrophilic and basic compound, polyimide fibers having more preferable physical properties can be obtained. However, the method for producing a polyimide fiber of the present disclosure is not limited to the above method, and the monomer components of polyimide and the hydrophilic and basic compound may be added simultaneously or the hydrophilic and basic compound may be added prior to the monomers for formation of the polyimide precursor.

The concentration of the polyimide precursor solution when the components of the polyimide precursor are dissolved in the organic solvent is in the range of, for example, 1% by weight to 50% by weight inclusive and preferably in the range of 10% by weight to 30% by weight inclusive.

In the method for producing a polyimide fiber according to the present embodiment, the polyimide precursor solution may be prepared by using the prepared polyimide precursor. In this case, the precursor formation step can be omitted. In this case, the prepared polyimide precursor contains a tetracarboxylic acid-based compound-derived unit and a diamine-derived unit.

In the coagulation step (S11), the polyimide precursor solution thus prepared is extruded into a coagulation bath containing water as a main component to form a polyimide precursor fiber.

In the coagulation step (S11), a nozzle of an extruder used for extruding the polyimide precursor solution into a shape of fiber has a diameter in the range of, for example, 0.05 mm to 0.30 mm inclusive. The diameter of the nozzle of the extruder may be appropriately varied according to the desired diameter of fibers.

The liquid component of the coagulation bath during spinning preferably contains water as a main component. The term "main component" as used herein means the component which accounts for 90% by mass to 100% by mass inclusive of the liquid of the coagulation bath. In the present embodiment, the liquid component in the coagulation bath during spinning may be solely water. Examples of components other than water include alcohols, N-methyl-2-pyrrolidone (NMP), N-ethyl-2-pyrrolidone (NEP), N,N-dimethylformamide (DMF), N,N-dimethylacetamide (DMAc), N,N-diethylacetamide (DEAc), N,N-dimethylpropionamide (DMPr), N,N-dimethylbutylamide (NMBA),N, N-dimethylisobutylamide (NMIB), N-methylcaprolactam (NMC), N,N-bis(methoxymethyl)acetamide, N-acetylpyrrolidine (NAPr), N-acetylpiperidine, N-methylpiperidone-2 (NMPD), N,N'-dimethylethyleneurea, N, N'-dimethylpropyleneurea, N, N, N',N'-tetramethylmalonamide, N-acetylpyrrolidone, N,N,N',N'-tetramethylurea (TMU), dimethyl sulfoxide (DMSO) and the like. When the coagulation step is in progress, the coagulation bath contains a small amount of the organic solvent which is contained in the extruded polyimide precursor solution.

In the water washing step (S12) following the coagulation step (S11), the spun polyimide precursor fiber is washed with, for example, water and the like. In the water washing step, the spun polyimide precursor fiber is allowed to pass through a water tank having a predetermined length. Although water is used in the water washing step of the present embodiment, a solvent used in the washing step of the present disclosure is not necessarily limited to water. The solvent used may include a poor solvent or nonsolvent for the polyimide precursor. Examples of the solvent include alcohols.

In the drawing step (S13), the polyimide fiber after washing with water is drawn in a drawing bath containing, for example, water. In the present embodiment, drawing is carried out in one drawing bath; however, the present disclosure is not limited to the embodiment and two or more drawing baths may be used for multi-step stretching. It is not necessary to carry out the drawing step in a drawing bath, and the drawing step may be carried out in the atmosphere. The solvent in the drawing bath is not limited to water and may be a poor solvent or nonsolvent for the polyimide precursor. Examples of the solvent include alcohols.

In the drawing step (S13), the fibrous article may be drawn at a draw ratio of, for example, 1.1 or above. The draw ratio can be determined from the ratio of the velocity $V_2/V_1$, i.e., the ratio of the velocity $V_2$ of the fibrous article at an outlet of the drawing bath to the velocity $V_1$ of the fibrous article at an inlet of the drawing bath (see FIG. 1). The draw ratio is preferably 1.5 or above. The fibrous article is drawn at a draw ratio which is less than the draw ratio at cutting (namely, the draw ratio at or below the ratio immediately before cutting). Configuring the draw ratio within the numerical range can provide effects of an increased strength and an increased elastic modulus.

In the take-up step (S14), the polyimide precursor fiber after the drawing step is taken up onto a resin pipe such as a polypropylene pipe (PP pipe). The pipe onto which the fiber is taken up is steeped in water to remove the organic solvent attached to the polyimide precursor fiber. Thereafter, the polyimide precursor fiber may be steeped in, for example, an alcohol to remove water in the polyimide precursor fiber. The series of steps is referred to as the steeping step (S15).

The heat drawing step (S16) follows. In the heat drawing step (S16), the polyimide precursor fiber is heated while being drawn. By heating, the polyimide precursor is imidized to give a polyimide fiber. As shown in FIG. 1, the heat drawing step (S16) is carried out with two driving rollers 61 and 62 and a tubular furnace 63 disposed between two driving rollers. The driving rollers 61 and 62 deliver the fibrous article formed with polyimide precursor or polyimide in the direction of the arrow shown in FIG. 1 while drawing the same. The temperature in the tubular furnace 63 is adjusted in the range of, for example, 350° C. to 500° C. inclusive and preferably 375° C. to 475° C. inclusive. When the fibrous article passes through the tubular furnace 63, the polyimide precursor is imidized, resulting in formation of the polyimide fiber.

In the heat drawing step (S16), the fibrous article is drawn at a draw ratio of, for example, 1.1 or above. The draw ratio in the heat drawing step (S16) can be determined from, similar to the draw ratio in the drawing step (S13), the ratio of the velocity of the fibrous article at an outlet of the tubular furnace 63 to the velocity of the fibrous article at an inlet of the tubular furnace 63. The fibrous article is drawn at a draw ratio which is less than the draw ratio at cutting (namely, the draw ratio at or below the ratio immediately before cutting). Configuring the draw ratio within the range can result in polyimide fibers having high strength and high elastic modulus.

According to the production steps as described above, the polyimide fibers are formed. According to the method for producing a polyimide fiber, the polyimide precursor solution contains the hydrophilic and basic compound (e.g., a 1,3-diazole-based compound), and thus polyimide fibers having preferable physical properties can be obtained by using an aqueous coagulation bath having decreased burdens on the environment. In addition, the polyimide fiber obtained with the production method according to the present embodiment has a strength that allows use thereof as a fiber material such as fiber reinforced plastic (FRP). Moreover, in the production method, the polyimide precursor solution contains the hydrophilic and basic compound, and thus the spun fiber (i.e., the polyimide precursor fiber) also contains the hydrophilic and basic compound. Because the polyimide precursor fiber contains the hydrophilic and basic compound, imidization of polyamic acid is promoted in the heat drawing step following the coagulation step. It is believed that this is because the hydrophilic and basic compound acts as an imidization agent. This leads to reduction in the time required for production of polyimide fibers.

Although it is not shown in FIG. 1, a drying step of drying the obtained polyimide precursor fiber in the atmosphere of normal temperature may be provided between the steeping step (S15) and the heat drawing step (S16).

<Polyimide Fiber>

The polyimide fiber of the present disclosure is now described. An example of the polyimide fiber of the present disclosure may be the polyimide fiber produced by the method for producing the polyimide fiber described above. However, the present disclosure is not limited thereto.

Another example of the polyimide fiber of the present disclosure maybe a polyimide fiber having a coefficient of thermal expansion in the range of −15 ppm/K to 0 ppm/K inclusive. When the polyimide fiber has the coefficient of thermal expansion of at or above −15 ppm/K, excess shrinkage of the fiber at high temperature can be suppressed. When the polyimide fiber has the coefficient of thermal expansion of at or below 0 ppm/K, dimensional stability can be obtained. The polyimide fiber preferably has a coefficient of thermal expansion of −11 ppm/K to −3 ppm/K inclusive and more preferably −10 ppm/K to −6 ppm/K inclusive.

The coefficient of thermal expansion of the polyimide fiber can be measured on a measurement device such as a thermomechanical analyser TMA-60 (Shimadzu Corporation).

In the method for measuring the coefficient of thermal expansion, while applying a predetermined load on an object to be measured (e.g., the polyimide fiber), the temperature is raised within a predetermined range at a predetermined heating rate. The coefficient of expansion within the predetermined temperature range (e.g., 100° C. to 200° C. inclusive) is then measured on the analyser TMA-60.

The polyimide fiber of the present disclosure as described above may have an elastic modulus in the range of 320 cN/dtex to 1,100 cN/dtex inclusive. When the polyimide fiber has an elastic modulus of at or above 320 cN/dtex, an effect of less deformation can be obtained. The elastic modulus is preferably in the range of 490 cN/dtex to 1,100 cN/dtex inclusive and more preferably 650 cN/dtex to 1,100 cN/dtex inclusive. The elastic modulus (cN/dtex) is converted to the elastic modulus (GPa) by the following equation:

$$\text{Elastic modulus(GPa)} = \text{Elastic modulus(cN/dtex)} \times \text{Specific gravity}/10$$

The elastic modulus of the polyimide fiber may be measured, for example, according to the method pursuant to the method of "JIS R7606" specified by Japanese Industrial Standards (JIS).

The polyimide fiber of the present disclosure as described above may have a strength in the range of 6.5 cN/dtex to 25 cN/dtex inclusive. The polyimide fiber preferably has a strength in the range of 10 cN/dtex to 25 cN/dtex inclusive, more preferably in the range of 13 cN/dtex to 25 cN/dtex inclusive and still more preferably in the range of 15 cN/dtex to 25 cN/dtex inclusive. The strength (cN/dtex) is converted to the strength (GPa) by the following equation:

$$\text{Strength(GPa)} = \text{Strength(cN/dtex)} \times \text{Specific gravity}/10$$

The strength of the polyimide fiber may be measured according to the method pursuant to the method of "JIS R7606" specified by Japanese Industrial Standards (JIS).

In the present embodiment, the polyimide fiber may have a fineness (dtex) of at or below 10 (dtex). By configuring the polyimide fiber to have such a fineness, the fiber which is more flexible can be obtained. In the present embodiment, the polyimide fiber may have an elongation (%) of at or above 1.5(%). As a result of the feature, the fiber which is flexible can be obtained. In order to obtain the fiber which is further flexible, in the present embodiment, the polyimide fiber preferably has an elongation (%) of at or above 2.0(%) and more preferably at or above 2.5(%). In the present embodiment, the polyimide fiber may have a glass transition temperature (° C.) of at or above 300(° C.). Accordingly, the fiber may have an increased heat resistance. In order to obtain the fiber having a further increased heat resistance, in the present embodiment, the polyimide fiber preferably has a glass transition temperature (° C.) of at or above 315(° C.) and more preferably at or above 330(° C.).

In the present embodiment, the polyimide fiber preferably has a specific gravity in the range of 1.45 to 1.55 inclusive. Further, in the present embodiment, the polyimide fiber preferably has an equilibrium moisture regain (%) of at or below 2(%) and more preferably at or below 1(%).

The polyimide fiber of the present disclosure as described above may be produced, for example, according to the method for producing the polyimide fiber of the present disclosure. As described above, in the method for producing the polyimide fiber of the present disclosure, the polyimide precursor solution contains the hydrophilic and basic compound (e.g., a 1,3-diazole-based compound), and thus polyimide fibers produced with the method may contain the residual hydrophilic and basic compound. From this reason, the polyimide fiber of the present disclosure may contain the hydrophilic and basic compound.

Namely, the polyimide fiber of the present disclosure may be produced from the polyimide precursor solution containing polyamic acid. As described above, the polyimide precursor solution is obtained by polymerising the tetracarboxylic acid-based compound and the diamine compound in the organic solvent. From this reason, the polyimide fiber of the present disclosure contains, in the molecular structure of polyimide, a tetracarboxylic acid-based compound-derived unit and a diamine-derived unit. For example, the polyimide in the polyimide fiber of the present disclosure is formed with a tetracarboxylic acid-based compound-derived unit and a diamine-derived unit.

Another example of the polyimide fiber of the present disclosure may be a polyimide fiber containing the hydrophilic and basic compound (e.g., a 1,3-diazole-based compound). The coefficient of thermal expansion of the polyimide fiber in this context is not necessarily limited to the range of −15 ppm/k to 0 ppm/k inclusive as described above.

The polyimide fiber of the present disclosure is preferably non-thermoplastic. Namely, the polyimide fiber of the present disclosure may be a non-thermoplastic polyimide fiber. When the polyimide fiber is non-thermoplastic, softening and deformation of the fiber upon heating may be suppressed.

The polyimide fiber of the present disclosure may have relatively high strength retention at high temperature. Specifically, it is preferable that the polyimide fiber retains 90% or more of the strength after maintaining the fiber for 100 hours at 300° C.

<Polyimide Precursor Solution>

The polyimide precursor solution of the present disclosure is now described. The polyimide precursor solution of the present disclosure is a polyimide precursor solution for production of a polyimide fiber by wet spinning or dry-wet spinning. The polyimide precursor solution contains a polyimide precursor and a hydrophilic and basic compound (e.g., a 1,3-diazole-based compound) and a solvent dissolving the foregoing.

The polyimide precursor in the polyimide precursor solution is polyamic acid. Polyamic acid is obtained by polymerising approximately equivalent moles of a tetracarboxylic acid-based compound and a diamine compound. The molar ratio between the tetracarboxylic acid-based compound and the diamine compound is generally in the range of 55:45 to 45:55. The molar ratio between the tetracarboxylic acid-based compound and the diamine compound may be appropriately varied beyond the above range as far as the purpose of the present disclosure is attained. The polyimide precursor in the polyimide precursor solution of the present disclosure has been described in details in the section of the method for producing the polyimide fiber, and thus the details are omitted here.

For the hydrophilic and basic compound (e.g., a 1,3-diazole-based compound) in the polyimide precursor solution, those described in the section of the method for producing the polyimide fiber can be similarly applied, and thus the details are omitted here.

For the solvent in the polyimide precursor solution, those described in the section of the method for producing the polyimide fiber can be similarly applied, and thus the details are omitted here.

The polyimide precursor solution of the present disclosure may also contain, in addition to the above, a dehydrating agent, an imidization agent, a catalyst, a filler, an antioxidant, a flame retardant, an antifoaming agent, a lubricant, a colorant, a silane coupling agent, a levelling agent, a rheology control agent and the like.

<Polyimide Precursor Fiber>

The polyimide precursor fiber of the present disclosure is now described. An example of the polyimide precursor fiber of the present disclosure may be the fibrous article before being subjected to the heat drawing step (S16) in the method for producing the polyimide fiber as described above. Namely, the polyimide precursor fiber of the present disclosure can be obtained by, for example, with the same method as the method for producing the polyimide precursor fiber as described above, preparing a polyimide precursor solution and spinning the solution into a shape of fiber.

The polyimide precursor fiber of the present disclosure contains at least a polyimide precursor and a hydrophilic and basic compound (e.g., a 1,3-diazole-based compound).

The polyimide precursor in the polyimide precursor fiber is polyamic acid. Polyamic acid is obtained by polymerising approximately equivalent moles of a tetracarboxylic acid-based compound and a diamine compound. The molar ratio between the tetracarboxylic acid-based compound and the diamine compound is generally in the range of 55:45 to 45:55. The molar ratio between the tetracarboxylic acid-based compound and the diamine compound may be appropriately varied beyond the above range as far as the purpose of the present disclosure is attained. The polyimide precursor in the polyimide precursor fiber of the present disclosure has been described in details in the section of the method for producing the polyimide fiber, and thus the details are omitted here.

For the hydrophilic and basic compound (e.g., a 1,3-diazole-based compound) in the polyimide precursor fiber, those described in the section of the method for producing the polyimide fiber can be similarly applied, and thus the details are omitted here.

The polyimide precursor fiber of the present disclosure is, for example, drawn while being heated according to the method in the heat drawing step (S16) in the method for producing the polyimide fiber as described above, to give a polyimide fiber. The polyimide fiber obtained from the polyimide precursor fiber of the present disclosure is an example of the polyimide fiber of the present disclosure.

<Method of Using 1,3-diazole>

A method of using 1,3-diazole of the present disclosure is a method of using, in production of a polyimide fiber using a polyimide precursor solution as a starting material, a 1,3-diazole-based compound as a coagulation alleviating agent of a polyimide precursor in a polyimide precursor solution. The method may be carried out by using a compound other than the 1,3-diazole-based compound such as N, N-dimethylethanolamine and triisopropanolamine. Namely, in production of a polyimide fiber using a polyimide precursor solution as a starting material, a method of using the hydrophilic and basic compound is also an embodiment of the present disclosure.

According to the method of using 1,3-diazole of the present disclosure, the polyimide precursor solution contains the 1,3-diazole-based compound, and thus rapid coagulation of the polyimide precursor can be prevented when the polyimide precursor solution is extruded into an aqueous solvent.

If the polyimide precursor solution does not contain a 1,3-diazole-based compound, the fibrous polyimide precursor extruded into an aqueous solvent is rapidly coagulated at the circumference thereof while the central part thereof may not be coagulated and may likely become highly viscous liquid. Under such circumstances, formation of polyimide fibers is impossible.

However, when production of polyimide fibers is carried out with the present method by wet spinning or dry-wet spinning, the 1, 3-diazole-based compound in the polyimide precursor solution acts as a coagulation alleviating agent for the polyimide precursor. Therefore, polyimide fibers having preferable physical properties can be produced.

It should be understood that the embodiments described herein are examples in every aspect and are not limiting. It is intended that the scope of the present disclosure is defined by the claims and not by the descriptions hereinabove and includes all modifications equivalent to and in the scope of the claims.

EXAMPLES

The present disclosure is hereinafter more specifically described byway of Examples. Examples hereinbelow are shown only for the purpose of illustration, however, and are not intended to limit the present invention thereto.

Example 1

1. Preparation of Polymer-Type Polyimide Precursor Solution

To a 3-L container for synthesis attached with a stirring blade, 136 g of para-phenylenediamine (PPD) and 2,224 g of N-methylpyrrolidone were charged to dissolve PPD in N-methylpyrrolidone. Then, 259.0 g of 3,3',4,4'-biphenyltetracarboxylic dianhydride (BPDA) and 82.30 g of pyromellitic dianhydride (PMDA) were charged to allow reaction at room temperature in order to prepare a polyimide precursor solution having a concentration of 17.7% by weight.

As shown in Table 1, the composition (molar ratio) between BPDA, PMDA and PPD was BPDA:PMDA:PPD=70:30:100.

To the obtained polyimide precursor solution, a solution obtained by dissolving 21.41 g of 1,3-diazole (Log P: −0.02, pKa: 6.99) in 40.41 g of N-methylpyrrolidone was then added to obtain a polyimide precursor solution for spinning. The concentration molar ratio of 1,3-diazole relative to 1 mole of tetracarboxylic dianhydride (BPDA+PMDA) was 0.25 moles as indicated in Table 1.

2. Spinning and Heat Drawing of Polyimide Precursor Fiber

The polyimide precursor solution for spinning obtained according to the above method was extruded from a spinning extruder and then introduced into a coagulation bath containing water as a main component to form into a shape of fiber. The spinning extruder used in the present Example had a nozzle diameter of 0.1 mm and 25 nozzle pores. The extrusion amount per unit time was 3.2 cc/min.

Thereafter, the fibrous polyimide precursor was washed with water to obtain a polyimide precursor fiber. The obtained polyimide precursor fiber was then allowed to pass through a drawing bath for drawing. In the drawing step, the draw ratio was 1.8 (see Table 1). The drawn polyimide precursor fiber was wound onto a PP pipe and steeped in water and then in ethanol.

Thereafter, on a heat drawing machine, the polyimide precursor fiber was drawn under heating to give a polyimide fiber. In the heat drawing step, the heating temperature was 400° C. (see Table 1).

In the following Examples 2 to 14, polyimide fibers were produced by appropriately varying the composition (tetracarboxylic dianhydrides and the diamine compound) of polyimide in the polyimide precursor solution, the coagulation alleviating agent added and production conditions of the fibers from Example 1.

Example 2

In Example 2, a polyimide fiber was produced by using the polyimide precursor solution having the same composition as Example 1. However, in Example 2, a polyimide precursor solution for spinning was obtained by adding to the resulting polyimide precursor solution a solution obtained by dissolving 10.71 g of 1,3-diazole (Log P: −0.02, pKa: 6.99) in 20.22 g of N-methylpyrrolidone. The concentration molar ratio of 1,3-diazole relative to 1 mole of tetracarboxylic dianhydride (BPDA+PMDA) was 0.125 moles as indicated in Table 1.

Example 3

In Example 3, a polyimide fiber was produced by using the polyimide precursor solution having the same composition as Example 1. However, in Example 3, a polyimide precursor solution for spinning was obtained by adding to the resulting polyimide precursor solution a solution obtained by dissolving 34.26 g of 1,3-diazole (Log P: −0.02, pKa: 6.99) in 64.67 g of N-methylpyrrolidone. The concentration molar ratio of 1, 3-diazole relative to 1 mole of tetracarboxylic dianhydride (BPDA+PMDA) was 0.40 moles as indicated in Table 1.

Example 4

In Example 4, a polyimide fiber was produced by using the polyimide precursor solution for spinning having the same composition as Example 1. However, in Example 4, the heating temperature in the heat drawing step was 450° C. (see Table 1).

Example 5

In Example 5, the polyimide composition was the same as Example 1. In addition, in Example 5, the coagulation alleviating agent used was 1-methyl-1,3-diazole (Log P: −0.19, pKa: 6.95) (see Table 1). The production conditions of the fiber were the same as Example 1 (see Table 1).

Example 6

Figure 2:
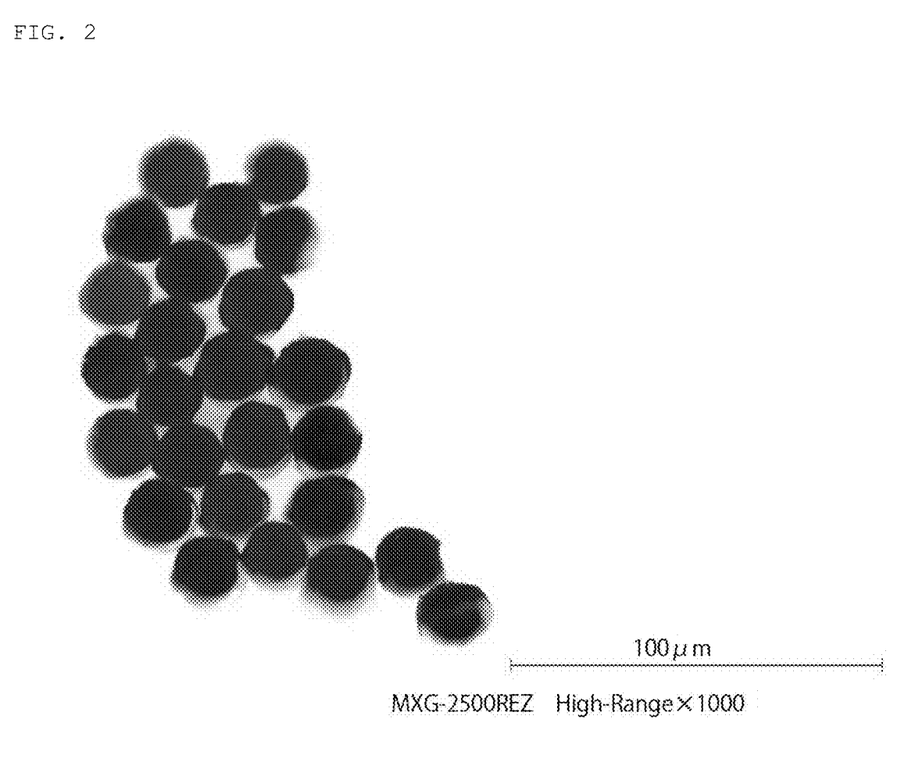
FIG. 2 is an image of the section of the polyimide fiber of Example 6 obtained on a microscope.

In Example 6, a polyimide fiber was produced by using the polyimide precursor solution for spinning having the same composition as Example 5. However, in Example 6, the nozzle diameter of the spinning extruder was 0.075 mm and the draw ratio in the drawing step was 1.7 (see Table 1). The section of the polyimide fiber obtained in Example 6 was photographed on a microscope. The result is shown in FIG. 2.

Example 7

In Example 7, the polyimide composition was the same as Example 1. In addition, in Example 7, the coagulation alleviating agent used was 2-methyl-1,3-diazole (Log P: 0.24, pKa: 7.86) (see Table 1). The production conditions of the fiber were the same as Example 1 (see Table 1).

Example 8

In Example 8, the polyimide composition was the same as Example 1. In addition, in Example 8, the coagulation alleviating agent used was 1,2-dimethyl-1,3-diazole (Log P: 0.11, pKa: 7.76) (see Table 1). The production conditions of the fiber were the same as Example 1 (see Table 1).

Example 9

In Example 9, the polyimide composition was BPDA: PMDA:PPD=60:40:100 (see Table 1). In addition, in Example 9, the coagulation alleviating agent used was 1-methyl-1,3-diazole (Log P: −0.19, pKa: 6.95) (see Table 1). The production conditions of the fiber were the same as Example 1 (see Table 1).

Example 10

In Example 10, the polyimide composition was BPDA: PPD=100:100 (see Table 1). In Example 10, PMDA was not added. In addition, in Example 10, the coagulation alleviating agent used was 1,3-diazole (Log P: −0.02, pKa: 6.99) (see Table 1). In addition, the production conditions of the fiber in Example 10 were such that the draw ratio in the drawing step was 2.0 and the heating temperature in the heat drawing step was 450° C. (see Table 1).

Example 11

In Example 11, the polyimide composition was the same as Example 10. In addition, in Example 11, the coagulation alleviating agent used was 1-methyl-1,3-diazole (Log P: −0.19, pKa: 6.95) (see Table 1). In addition, the production conditions of the fiber in Example 11 were such that the draw ratio in the drawing step was 1.8 and the heating temperature in the heat drawing step was 450° C. (see Table 1).

Example 12

In Example 12, the polyimide composition was BPDA: PMDA:ODA:PPD=70:30:15:85 (see Table 1). In Example 12, two diamine compounds (ODA and PPD) were used. In addition, in Example 12, the coagulation alleviating agent used was 1-methyl-1,3-diazole (Log P: −0.19, pKa: 6.95) (see Table 1). The production conditions of the fiber were the same as Example 1 (see Table 1).

Example 13

In Example 13, the polyimide composition was the same as Example 1. In addition, in Example 13, the coagulation alleviating agent used was N,N-dimethylethanolamine (Log P: −0.55, pKa: 9.30) (see Table 1). The production conditions of the fiber were the same as Example 1 (see Table 1). The concentration molar ratio of N, N-dimethylethanolamine relative to 1 mole of tetracarboxylic dianhydride (BPDA+PMDA) was 0.175 moles as indicated in Table 1.

Example 14

In Example 14, the polyimide composition was the same as Example 1. In addition, in Example 14, the coagulation alleviating agent used was triisopropanolamine (Log P: −0.015, pKa: 8.06) (see Table 1). The production conditions of the fiber were the same as Example 1 (see Table 1). The concentration molar ratio of triisopropanolamine relative to 1 mole of tetracarboxylic dianhydride (BPDA+PMDA) was 0.25 moles as indicated in Table 1.

Table 1 summarises the compositions of the polyimide precursor solutions and production conditions of Examples.

TABLE 1

| | Polyimide composition (molar ratio) | | | | Coagulation alleviating agent | | | | Nozzle pore diameter (mm) | Draw ratio | Heat drawing temperature (° C.) |
|---|---|---|---|---|---|---|---|---|---|---|---|
| Ex. | BPDA | PMDA | ODA | PPD | Type | Log P | pKa | Conc. molar ratio | | | |
| 1 | 70 | 30 | 0 | 100 | 1,3-diazole | −0.02 | 6.99 | 0.25 | 0.1 | 1.8 | 400 |
| 2 | 70 | 30 | 0 | 100 | 1,3-diazole | −0.02 | 6.99 | 0.125 | 0.1 | 1.8 | 400 |
| 3 | 70 | 30 | 0 | 100 | 1,3-diazole | −0.02 | 6.99 | 0.40 | 0.1 | 1.8 | 400 |
| 4 | 70 | 30 | 0 | 100 | 1,3-diazole | −0.02 | 6.99 | 0.25 | 0.1 | 1.8 | 450 |
| 5 | 70 | 30 | 0 | 100 | 1-methyl-1,3-diazole | −0.19 | 6.95 | 0.25 | 0.1 | 1.8 | 400 |
| 6 | 70 | 30 | 0 | 100 | 1-methyl-1,3-diazole | −0.19 | 6.95 | 0.25 | 0.075 | 1.7 | 400 |
| 7 | 70 | 30 | 0 | 100 | 2-methyl-1,3-diazole | 0.24 | 7.86 | 0.25 | 0.1 | 1.8 | 400 |
| 8 | 70 | 30 | 0 | 100 | 1,2-dimethyl-1,3-diazole | 0.11 | 7.76 | 0.25 | 0.1 | 1.8 | 400 |
| 9 | 60 | 40 | 0 | 100 | 1-methyl-1,3-diazole | −0.19 | 6.95 | 0.25 | 0.1 | 1.8 | 400 |
| 10 | 100 | 0 | 0 | 100 | 1,3-diazole | −0.02 | 6.99 | 0.25 | 0.1 | 2.0 | 450 |
| 11 | 100 | 0 | 0 | 100 | 1-methyl-1,3-diazole | −0.19 | 6.95 | 0.25 | 0.1 | 1.8 | 450 |
| 12 | 70 | 30 | 15 | 85 | 1-methyl-1,3-diazole | −0.19 | 6.95 | 0.25 | 0.1 | 1.8 | 400 |
| 13 | 70 | 30 | 0 | 100 | N,N-dimethylethanolamine | −0.55 | 9.30 | 0.175 | 0.1 | 1.8 | 400 |
| 14 | 70 | 30 | 0 | 100 | triisopropanolamine | −0.015 | 8.06 | 0.25 | 0.1 | 1.8 | 400 |

3. Analysis of Physical Properties of Polyimide Fibers

The polyimide fibers of Examples obtained according to the method described above were analysed for physical properties according to the following methods. The results are shown in Table 2. The glass transition temperature and the coefficient of thermal expansion were measured only for some of the polyimide fibers of Examples. In Table 2, the results of Examples measured are shown and the columns for Examples which are not measured are left blank.

(Glass Transition Temperature)

By using a dynamic viscoelasticity analyser DM6100 produced by Seiko Instruments Inc., a sinusoidal load of oscillation of 98 mN and frequency of 1.0 Hz was applied to the polyimide fibers and the loss elastic modulus in the course of heating at 2° C./min was determined to measure the glass transition temperature.

(Fineness)

The polyimide fibers were measured for the fineness by using an autovibro-type fineness analyser DC 21 produced by Search K.K.

(Specific Gravity)

The specific gravity of the polyimide fibers was measured by the sink-float method using toluene and carbon tetrachloride. The specific gravity was measured at 25° C.

(Tensile Properties)

The obtained polyimide fibers were measured for the elastic modulus (cN/dtex), strength (cN/dtex) and elongation (%) by the method pursuant to "JIS R7607". The elastic modulus (GPa) was calculated from a conversion equation: elastic modulus (cN/dtex)× specific gravity/10. The strength (GPa) was calculated from a conversion equation: strength (cN/dtex)× specific gravity/10.

(Coefficient of Thermal Expansion)

The polyimide fibers were measured for the coefficient of thermal expansion by using a thermomechanical analyser TMA-60 (Shimadzu Corporation)

In this method, while applying a predetermined load as indicated below on an object to be measured (e.g., the polyimide fibers), the temperature was raised within a predetermined range at a predetermined heating rate, and the coefficient of expansion within the predetermined temperature range (e.g., 100° C. to 200° C. inclusive) was then measured on the analyser TMA-60. In the present Examples, measurement was carried out twice under the following conditions and the coefficient of expansion in the temperature range of 100° C. to 200° C. inclusive during the second measurement procedure was regarded as the coefficient of thermal expansion (ppm/K) of the fiber.

(First Measurement Procedure)

Measurement temperature range: 40° C. to 350° C.

Heating rate: 10° C./min

Load: 2.0 g (Second measurement procedure)

Measurement temperature range: 40° C. to 350° C.

Heating rate: 5° C./min

Load: 2.0 g (Strength Retention)

In a tubular furnace at 250° C. or 300° C., an object to be measured (the obtained polyimide fiber) was maintained for 100 hours under no tension. Thereafter, the tensile strength after 100 hours was measured. Then the proportion of the tensile strength after 100 hours relative to the tensile strength at the beginning was determined as the tensile strength retention (%).

(Equilibrium Moisture Regain)

An object to be measured (the obtained polyimide fiber) was maintained for 24 hours at temperature of 25° C. and at 60% relative humidity. Thereafter, an amount of moisture in the object, which achieved equilibrium, was measured by Karl Fischer's method.

The fineness (dtex), strength (cN/dtex, GPa), elastic modulus (cN/dtex, GPa), elongation (%), specific gravity, coefficient of thermal expansion (ppm/K), strength retention, glass transition temperature (loss elastic modulus) (° C.) and equilibrium moisture regain of the polyimide fibers measured according to the above methods are shown in Table 2.

TABLE 2

| Ex. | Fineness (dtex) | Strength (cN/dtex) | Strength (GPa) | Elastic modulus (cN/dtex) | Elastic modulus (GPa) | Elongation (%) | Specific gravity | Coefficient of thermal expansion (ppm/K) | Glass transition temperature (loss elastic modulus) (° C.) | 250° C. strength retention (%) | 300° C. strength retention (%) | Equilibrium moisture regain (%) |
|---|---|---|---|---|---|---|---|---|---|---|---|---|
| 1 | 5.4 | 12.4 | 1.88 | 760 | 115 | 1.90 | 1.51 | −8.3 | 355 | 100 | 93 | 0.9 |
| 2 | 5.4 | 13.0 | 1.95 | 760 | 114 | 1.90 | 1.50 | −8.5 | 356 | 100 | 94 | 0.8 |
| 3 | 5.4 | 11.5 | 1.73 | 720 | 108 | 1.85 | 1.50 | | 355 | 100 | 95 | 0.9 |
| 4 | 5.4 | 16.7 | 2.51 | 760 | 114 | 2.35 | 1.50 | −9.0 | 355 | 100 | 93 | 0.7 |
| 5 | 5.4 | 15.0 | 2.26 | 740 | 111 | 2.40 | 1.51 | −10.0 | | | | 0.8 |
| 6 | 3.4 | 13.4 | 2.03 | 870 | 132 | 1.70 | 1.51 | −7.3 | 355 | 100 | 95 | 0.8 |
| 7 | 6.0 | 11.5 | 1.73 | 780 | 117 | 1.70 | 1.50 | | | | | 0.8 |
| 8 | 6.7 | 12.0 | 1.80 | 760 | 114 | 1.74 | 1.50 | | | | | 0.8 |
| 9 | 5.5 | 12.1 | 1.82 | 710 | 107 | 2.10 | 1.50 | −7.2 | 373 | 100 | 95 | 1.0 |
| 10 | 5.5 | 11.7 | 1.74 | 640 | 95 | 2.11 | 1.48 | | | | | 0.6 |
| 11 | 4.5 | 11.6 | 1.72 | 570 | 84 | 2.37 | 1.48 | −6.6 | 301 | 100 | | 0.6 |
| 12 | 5.3 | 12.4 | 1.84 | 480 | 71 | 3.60 | 1.48 | −7.7 | 315 | 100 | | 0.8 |
| 13 | 5.6 | 13.0 | 1.94 | 750 | 112 | 1.95 | 1.49 | −9.0 | | | | 0.8 |
| 14 | 5.4 | 12.5 | 1.85 | 740 | 110 | 2.10 | 1.48 | | 355 | 100 | 95 | 0.9 |

For comparison, the following tests were carried out as shown in Comparative Examples and Reference Examples.

Comparative Example 1

A polyimide precursor solution was prepared in the same manner as Example 1 except that 1,3-diazole was not added. It was then attempted to produce a polyimide fiber in the same manner as Example 1. However, when, in the coagulation step (S11), the polyimide precursor solution was extruded in an aqueous coagulation bath, the polyimide precursor solution instantly lost transparency and was coagulated, and thus was too brittle to be drawn.

Comparative Example 2

A polyimide precursor solution was prepared in the same manner as Example 1 except that pyridine (Log P: 0.65, pKa: 5.23) was used instead of 1,3-diazole. It was then attempted to produce a polyimide fiber in the same manner as Example 1. However, when, in the coagulation step (S11), the polyimide precursor solution was extruded in an aqueous coagulation bath, the polyimide precursor solution immediately lost transparency and was coagulated, and thus was too brittle to be drawn.

Comparative Example 3

A polyimide precursor solution was prepared in the same manner as Example 1 except that β-picoline (Log P: 1.2, pKa: 5.70) was used instead of 1,3-diazole. It was then attempted to produce a polyimide fiber in the same manner as Example 1. However, when, in the coagulation step (S11), the polyimide precursor solution was extruded in an aqueous coagulation bath, the polyimide precursor solution immediately lost transparency and was coagulated, and thus was too brittle to be drawn.

Comparative Example 4

A polyimide precursor solution was prepared in the same manner as Example 1 except that piperazine (Log P: −1.5, pKa: 9.73) was used instead of 1,3-diazole. It was then attempted to produce a polyimide fiber in the same manner as Example 1. However, when, in the coagulation step (S11), the polyimide precursor solution was extruded in an aqueous coagulation bath, the extruded fiber was flat and had insufficient coagulation, and thus drawing was impossible.

Comparative Example 5

A polyimide precursor solution was prepared in the same manner as Example 1 except that triethanolamine (Log P: −1.0, pKa: 7.76) was used instead of 1,3-diazole. It was then attempted to produce a polyimide fiber in the same manner as Example 1. However, when, in the coagulation step (S11), the polyimide precursor solution was extruded in an aqueous coagulation bath, the extruded fiber was flat and had insufficient coagulation, and thus drawing was impossible.

Comparative Example 6

A polyimide precursor solution was prepared in the same manner as Example 1 except that morpholine (Log P: −0.86, pKa: 8.49) was used instead of 1,3-diazole. It was then attempted to produce a polyimide fiber in the same manner as Example 1. However, when, in the coagulation step (S11), the polyimide precursor solution was extruded in an aqueous coagulation bath, the extruded fiber was flat and had insufficient coagulation, and thus drawing was impossible.

Comparative Example 7

A polyimide precursor solution was prepared in the same manner as Example 1 except that triethylamine (Log P: 1.45, pKa: 10.78) was used instead of 1,3-diazole. It was then attempted to produce a polyimide fiber in the same manner as Example 1. However, when, in the coagulation step (S11), the polyimide precursor solution was extruded in an aqueous coagulation bath, the polyimide precursor solution immediately lost transparency and was coagulated, and thus was too brittle to be drawn.

Comparative Example 8

A polyimide precursor solution was prepared in the same manner as Example 1 except that tripropylamine (Log P: 2.79, pKa: 10.65) was used instead of 1,3-diazole. It was then attempted to produce a polyimide fiber in the same manner as Example 1. However, when, in the coagulation step (S11), the polyimide precursor solution was extruded in an aqueous coagulation bath, the polyimide precursor solution immediately lost transparency and was coagulated, and thus was too brittle to be drawn.

Comparative Example 9

A polyimide precursor solution was prepared in the same manner as Example 1 except that tributylamine (Log P: >2.79, pKa: 10.89) was used instead of 1,3-diazole. It was then attempted to produce a polyimide fiber in the same manner as Example 1. However, when, in the coagulation step (S11), the polyimide precursor solution was extruded in an aqueous coagulation bath, the polyimide precursor solution immediately lost transparency and was coagulated, and thus was too brittle to be drawn.

In Table 3, summaries of the composition of the polyimide precursor solutions and production conditions of Comparative Examples are shown.

TABLE 3

| Comp. Ex. | Polyimide composition (molar ratio) | | | | Coagulation alleviating agent | | | Nozzle pore diameter (mm) |
|---|---|---|---|---|---|---|---|---|
| | BPDA | PMDA | ODA | PPD | Type | Log P | pKa | Conc. molar ratio |
| 1 | 70 | 30 | 0 | 100 | None | — | — | — | 0.1 |
| 2 | 70 | 30 | 0 | 100 | Pyridine | 0.65 | 5.23 | 0.25 | 0.1 |
| 3 | 70 | 30 | 0 | 100 | β-picoline | 1.2 | 5.70 | 0.25 | 0.1 |
| 4 | 70 | 30 | 0 | 100 | Piperazine | −1.5 | 9.73 | 0.25 | 0.1 |
| 5 | 70 | 30 | 0 | 100 | Triethanolamine | −1.0 | 7.76 | 0.25 | 0.1 |
| 6 | 70 | 30 | 0 | 100 | Morpholine | −0.86 | 8.49 | 0.25 | 0.1 |
| 7 | 70 | 30 | 0 | 100 | Triethylamine | 1.45 | 10.78 | 0.25 | 0.1 |
| 8 | 70 | 30 | 0 | 100 | Tripropylamine | 2.79 | 10.65 | 0.25 | 0.1 |
| 9 | 70 | 30 | 0 | 100 | Tributylamine | >2.79 | 10.89 | 0.25 | 0.1 |

Reference Example 1

A polyimide precursor solution was prepared in the same manner as Example 1 except that 1,3-diazole was used at 0.05 moles relative to 1 mole of the tetracarboxylic dianhydride. It was then attempted to produce a polyimide fiber in the same manner as Example 1. However, when, in the coagulation step (S11), the polyimide precursor solution was extruded in an aqueous coagulation bath, the polyimide precursor solution immediately lost transparency and was coagulated, and thus was too brittle to be drawn.

Reference Example 2

A polyimide precursor solution was prepared in the same manner as Example 1 except that 1,3-diazole was used at 1.25 moles relative to 1 mole of the tetracarboxylic dianhydride. It was then attempted to produce a polyimide fiber in the same manner as Example 1. However, when, in the coagulation step (S11), the polyimide precursor solution was extruded in an aqueous coagulation bath, the polyimide precursor solution was rapidly swollen and had insufficient coagulation, and thus drawing was impossible.

From the above results, it is demonstrated that polyimide fibers having appropriate physical properties could be produced by adding a compound, as a coagulation alleviating agent, having an acid dissociation constant (pKa) of a conjugate acid in water at 25° C. of 6.0 to 10 inclusive and an octanol-water partition coefficient (Log P) at 25° C. of −0.75 to 0.75 inclusive. It was possible to configure the polyimide fibers obtained in Examples so as to have a fineness of at or below 10.

Polyimide has excellent characteristics in terms of heat resistance, chemical resistance, mechanical properties, electric properties and the like, and thus can be widely used in the fields of electronic components, batteries, automobiles, aerospace industry and the like. For example, the polyimide fiber according to the present disclosure and the polyimide fiber produced by the production method according to the present disclosure can be suitably used for spun yarn, cloth (e.g., woven fabrics (woven fabrics in plain weave, twill weave, sateen weave and the like), knit fabrics (knit fabrics in stocking stitch, garter stitch, rib stitch and the like), etc.), rubber materials such as tension members and tyres, ropes, cords and rods, composites, materials for protective clothing materials, printed substrates, friction materials and the like.

What is claimed is:

1. A polyimide fiber produced by a method comprising:
    forming a polyimide precursor fiber by extruding a polyimide precursor solution containing a polyimide precursor and a compound having an acid dissociation constant (pKa) of a conjugate acid in water at 25° C. in a range from 6.0 to 10 inclusive and an octanol-water partition coefficient (Log P) at 25° C. in a range from −0.75 to 0.75 inclusive into a poor solvent or nonsolvent for the polyimide precursor; and
    forming the polyimide fiber by drawing the polyimide precursor fiber while heating same,
    the polyimide precursor consisting of:
        a tetracarboxylic acid-based compound derived unit derived from at least either of a 3,3',4,4'-biphenyltetracarboxylic acid-based compound and a pyromellitic acid-based compound, and
        a diamine-based compound derived unit derived from para-phenylenediamine, and
    the polyimide fiber having a coefficient of thermal expansion in a range from −15 ppm/K to −6 ppm/K inclusive, the coefficient of thermal expansion being measured on a measurement device of a thermomechanical analyzer TMA-60 (Shimadzu Corporation).

2. The polyimide fiber according to claim 1, having an elastic modulus in a range from 320 cN/dtex to 1,100 cN/dtex inclusive,
    the elastic modulus being measured using the method pursuant to JIS R7607.

3. The polyimide fiber according to claim 1, having a strength in a range from 6.5 cN/dtex to 25 cN/dtex inclusive, the elastic modulus being measured using the method pursuant to JIS R7607.

4. The polyimide fiber according to claim 1, having a specific gravity in a range from 1.45 to 1.55 inclusive, the specific gravity being measured by sink-float method using toluene and carbon tetrachloride at 25° C.

5. The polyimide fiber according to claim 1, having an equilibrium moisture regain of at or below 2%, the equilibrium moisture regain being measured by Karl Fischer's method.

6. A method for producing a polyimide fiber comprising:
   forming a polyimide precursor fiber by extruding a polyimide precursor solution containing a polyimide precursor and a compound having an acid dissociation constant (pKa) of a conjugate acid in water at 25° C. in a range from 6.0 to 10 inclusive and an octanol-water partition coefficient (Log P) at 25° C. in a range from −0.75 to 0.75 inclusive into a poor solvent or nonsolvent for the polyimide precursor; and
   forming the polyimide fiber by drawing the polyimide precursor fiber while heating same,
   the polyimide precursor consisting of:
      a tetracarboxylic acid-based compound derived unit derived from at least either of a 3,3',4,4'-biphenyltetracarboxylic acid-based compound and a pyromellitic acid-based compound, and
      a diamine-based compound derived unit derived from phenylenediamine, and
   the polyimide fiber having a coefficient of thermal expansion in a range from −15 ppm/K to −6 ppm/K inclusive, the coefficient of thermal expansion being measured on a measurement device of a thermomechanical analyzer TMA-60 (Shimadzu Corporation).

7. The method for producing the polyimide fiber according to claim 6, wherein the poor solvent or the nonsolvent contains water as a main component.

8. The method for producing the polyimide fiber according to claim 6, wherein the polyimide precursor solution contains the compound in a range from 0.1 moles to 1.0 mole inclusive relative to 1 mole of the tetracarboxylic acid-based compound-derived unit.

9. The method for producing the polyimide fiber according to claim 6, further comprising:
   obtaining the polyimide precursor by polymerizing a tetracarboxylic acid-based compound and a diamine compound in an organic polar solvent, the tetracarboxylic acid-based compound being at least either of the 3,3',4,4'-biphenyltetracarboxylic acid-based compound and the pyromellitic acid-based compound, and the diamine compound being the phenylenediamine, wherein
   the polyimide precursor solution contains the compound in a range from 0.1 moles to 1.0 mole inclusive relative to 1 mole of the tetracarboxylic acid-based compound.

* * * * *